(12) United States Patent
Filipich et al.

(10) Patent No.: US 10,688,376 B2
(45) Date of Patent: Jun. 23, 2020

(54) PORTABLE GYROSCOPIC DEVICE FOR THE TRANSPORTATION OF OBJECTS OR INDIVIDUALS AND SET OF PORTABLE GYROSCOPIC DEVICE AND ACCESSORIES FOR THE TRANSPORTATION OF OBJECTS OR INDIVIDUALS COMPRISING IT

(71) Applicants: Carlos Damian Filipich, Bahia Blanca (AR); Carlos Pedro Filipich, Bahia Blanca (AR)

(72) Inventors: Carlos Damian Filipich, Bahia Blanca (AR); Carlos Pedro Filipich, Bahia Blanca (AR)

(*) Notice: Subject to any disclaimer, the term of this patent is extended or adjusted under 35 U.S.C. 154(b) by 0 days.

(21) Appl. No.: 15/926,807

(22) Filed: Mar. 20, 2018

(65) Prior Publication Data

US 2018/0272227 A1 Sep. 27, 2018

(30) Foreign Application Priority Data

Mar. 23, 2017 (AR) ................................ P170100732

(51) Int. Cl.
*A63C 5/08* (2006.01)
*A63C 17/00* (2006.01)
(Continued)

(52) U.S. Cl.
CPC .......... *A63C 17/0013* (2013.01); *A63C 17/01* (2013.01); *A63C 17/12* (2013.01); *A63C 17/26* (2013.01); *A63C 2203/22* (2013.01)

(58) Field of Classification Search
CPC ..... A63C 17/00; A63C 17/0013; A63C 17/12; A63C 17/26; A63C 17/01; A63C 17/015;
(Continued)

(56) References Cited

U.S. PATENT DOCUMENTS 5,956,660 A * 9/1999 Neumann ............... G01C 21/16
701/468
6,676,476 B1 * 1/2004 Lund ....................... A63H 1/20
446/234
(Continued)

FOREIGN PATENT DOCUMENTS

CN 202070119 12/2011
CN 202075852 12/2011
(Continued)

*Primary Examiner* — James M Dolak
(74) *Attorney, Agent, or Firm* — Gottlieb, Rackman & Reisman, PC

(57) ABSTRACT

The present invention provides a portable gyroscopic device for the transportation of objects or individuals which comprises:
a portable receptacle (A') which comprises:
a frame (1) on which an axis (3) of a gyroscopic element comprising one or more masses or flywheel units (2) is mounted;
at least one electric motor (8) which actuates at least one mass or flywheel unit of said gyroscopic element mentioned,
a source of electric power (5); and
electronic control means (6) to operate said electric motor. Besides, the invention provides a set of portable gyroscopic device and accessories for the transportation of objects or individuals which comprises the portable gyroscopic device according to claims 1 to 1 and
a transportation platform (11) which comprises elements for the transportation of said platform which are selected between mechanical bearings, drones, an air cushion and an electromagnetic field.

7 Claims, 9 Drawing Sheets

(51) Int. Cl.
*A63C 17/26* (2006.01)
*A63C 17/01* (2006.01)
*A63C 17/12* (2006.01)

(58) Field of Classification Search
CPC ... A63C 17/24; A63C 17/0006; A63C 17/006; A63C 17/0033; A63C 17/011; A63C 17/02; A63C 2203/22; A63C 2203/12; A63C 2203/18; B62D 37/00; B62D 37/04; B62D 37/06
See application file for complete search history.

(56) References Cited

U.S. PATENT DOCUMENTS

| | | | | |
|---|---|---|---|---|
| 7,467,681 | B2* | 12/2008 | Hiramatsu | A63C 17/004 |
| | | | | 180/188 |
| 8,146,929 | B1* | 4/2012 | Johnson | A63C 17/24 |
| | | | | 280/87.042 |
| 8,251,390 | B2* | 8/2012 | Reichstetter | B62M 1/10 |
| | | | | 280/217 |
| 8,562,386 | B2* | 10/2013 | Carlson | A63H 17/26 |
| | | | | 446/431 |
| 8,825,254 | B2* | 9/2014 | Kobashi | B62H 1/12 |
| | | | | 701/22 |
| 9,682,732 | B2* | 6/2017 | Strack | B62K 11/007 |
| 9,795,863 | B1* | 10/2017 | Linder | A63C 17/012 |
| 10,071,778 | B2* | 9/2018 | Campbell | B60L 7/12 |
| 10,245,937 | B2* | 4/2019 | Gillett | B60K 7/0007 |
| 10,507,376 | B2* | 12/2019 | Ma | A63C 17/0013 |
| 2005/0241864 | A1 | 11/2005 | Hiramatsu | |
| 2006/0070646 | A1* | 4/2006 | Denman | A45B 3/00 |
| | | | | 135/66 |
| 2007/0131462 | A1* | 6/2007 | Hemsley | A45C 5/14 |
| | | | | 180/19.3 |
| 2011/0031721 | A1 | 2/2011 | Turner et al. | |
| 2011/0272903 | A1 | 11/2011 | Lewis et al. | |
| 2013/0248573 | A1* | 9/2013 | Kim | A45F 4/02 |
| | | | | 224/576 |
| 2014/0260714 | A1* | 9/2014 | Vallery | A61H 3/00 |
| | | | | 74/5.37 |

FOREIGN PATENT DOCUMENTS

| | | |
|---|---|---|
| CN | 202179842 | 4/2012 |
| CN | 102847296 | 1/2013 |
| CN | 202751772 | 2/2013 |
| CN | 202920943 | 5/2013 |
| UA | 21272 | 3/2007 |

* cited by examiner

PORTABLE GYROSCOPIC DEVICE FOR THE TRANSPORTATION OF OBJECTS OR INDIVIDUALS AND SET OF PORTABLE GYROSCOPIC DEVICE AND ACCESSORIES FOR THE TRANSPORTATION OF OBJECTS OR INDIVIDUALS COMPRISING IT

CROSS-REFERENCE TO RELATED APPLICATION

This patent application claims benefit to Argentinian Patent Application No. P20170100732, filed Mar. 23, 2017, which is hereby incorporated by reference in its entirety as part of the present disclosure.

FIELD OF THE INVENTION

The present invention refers generally to the transportation of objects or individuals and more specifically to a means of movement such as skates, scooters, skateboards or propelled platforms, among others, that are capable of moving and making sudden changes in direction, rotation and nutation.

BACKGROUND TO THE INVENTION

Several devices exist, such as platforms, that are capable of transporting individuals or objects using omnidirectional bearings and which include electric motors for propulsion and means capable of balancing the movement of the user using the properties of a gyroscopic. Additionally, publications, including patents, scientific documents and displays of experimental vehicle prototypes that have one or more wheels capable of allowing the movement of the vehicle on its own fixed axis in all directions or on a revolving axis exist.

Hopetechnik, for example, has a vehicle called "the Omni-directional Motorized Wheel System" that is a prototype of a vehicle platform for the transportation of individuals in a hospital environment. The platform includes an omnidirectional bearing system that is used in supermarket trolleys. The platform is motorized and can be controlled using a remote control which includes the use of a gyroscope to stabilize the movement.

Numerous other platforms capable of performing movements in several directions and achieving the balance of the user by means of a gyroscope usually located in the platform itself (e.g., skateboard or roller skates) are known. On the other hand, the prior art teaches numerous platforms capable of performing movements in various directions to achieve user stabilization by including a gyroscope normally located on the platform itself (e.g., skateboard or roller skates).

The platform has a remote control and can move in multiple directions such as forward, backward, sideward and can rotate simultaneously. The use of omnidirectional bearings to this effect, is a well-known resource. In fact, several companies in the car industry have launched their own prototypes. That use novel system of bearings that includes a large wheel formed by a plurality of rollers that allow lateral movement.

Such is the case of the Honda U3-X, which is an experimental compact vehicle that is easily adapted between the legs of the rider to provide the free circulation in all directions: forward, backward, sideward or diagonally. The device includes a gyroscope to balance the movement of the rider without losing their balance.

Skateboards using this device are also known. For example, CN202070119 (U) describes a two-wheeled skateboard with an electric gyroscope and contains an actuation motor to propel the wheels, a gyroscope controller, a battery and tyres.

CN202751772 (U) describes an electric skateboard, which consists of a skate body, an actuation wheel, two driving wheels and a battery. The driving wheel is located at one end of the skateboard body. The driving wheels are located at the other end of the skateboard body. There is an actuation device located in the actuation wheel and it is electrically connected to a battery and a controller. The drive device comprises a motor to conduct the driving wheel. One rotating shaft of the motor is parallel to the surface of the skateboard body. When the motor (the driving wheel) revolves, it forms a gyroscopic balancing structure. For this reason, the electric skateboard is highly stable, the problem of unbalance on account of poor operation is substantially solved and the operation is quite simple.

U.S. Patent Publication No. 2011/0031721 discloses a combination of motorcycle/backpack in a single article. The article is a transportation device with a capacity to be transformed into a wheeled, land vehicle and for this reason it has two forms of use. The transportation device is similar to an ordinary backpack with two straps positioned to be placed on the user's shoulders as a backpack. The functions of wheeled-land vehicle are the same as the ones of an ordinary folding scooter. Two wheels mounted with propulsion means provided by the contact of the rider with the floor constitutes the use mode entitled scooter. A horizontal handlebar is located at the top of the combination and it is used for operating the front wheel when in scooter mode. The conversion between the backpack mode and the scooter mode is achieved by rising and lowering said handlebar and the manipulation of the releasable holding elements and latches. In both modes, as backpack and scooter, there is a cover surrounding the backpack/scooter to fasten and protect the components not in use.

This document refers to a device which can be carried inside a backpack and converted into a transportation vehicle where the backpack is part of it. There is no reference to a movement stabilization means such as a gyroscopic mechanism. The backpack in scooter mode, is not carried on the back of the user to offer stabilization and acceleration of the user's movement.

SUMMARY OF THE INVENTION

The present invention is directed to a device which uses the gyroscopic properties to produce sudden changes in direction and stability at the same time, and to transport objects or individuals (animals or persons). The portable gyroscopic device of the present invention can be used together with, for example, industrial or commercial platforms to transport objects, as well as in skateboards, scooters or other types of propelled platforms, such as drones platforms or those propelled by air or even by a magnetic field, or similar for the transportation of persons.

The portable gyroscopic device of the present invention can increment its movements and sudden changes in direction thanks to the effect of gyroscopic elements powered by electric motors which allow to generate the aforementioned effect. In a preferred mode of the invention, these gyroscopic elements are arranged within a portable receptacle for the user to carry it attached to their body.

DETAILED DESCRIPTION OF EMBODIMENTS OF THE INVENTION

Figure 1:
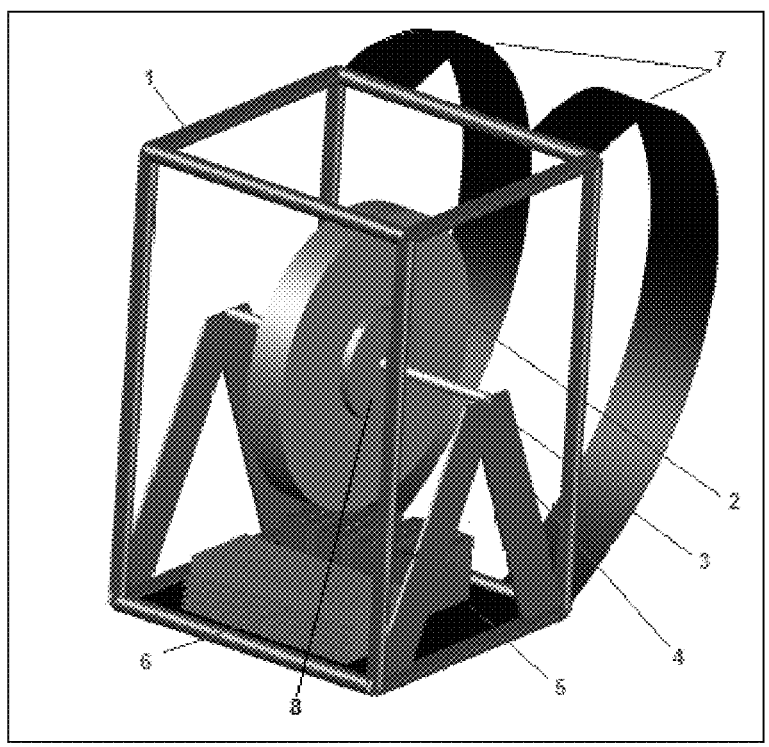
FIG. 1 is a perspective view of a first embodiment of components of a portable gyroscopic device of the present invention.

Gyroscopes are mechanical devices which are used to measure, maintain or change the orientation in space of some object, device or vehicle.

They are substantially formed by a body with rotation symmetry which revolves around the axis of said symmetry. When the gyroscope is subjected to a force movement which tends to change the orientation of its rotation axis, it behaves in an apparently paradoxical behavior, since it changes orientation rotating with regard to a third axis, perpendicular to that from which it has been pushed to turn to both the one respect to which it has been made to revolt and its original revolving axis.

If it is mounted on a cardan support which minimizes any external angular movement it simply revolves freely in space. The gyroscope keeps the orientation of its revolving axis facing external forces which might tend to deviate it better than a non-revolving object; it deviates much less and in a different direction.

Hence, it presents two fundamental properties: the gyroscopic inertia or "rigidity in space" and the precession which is the inclination of the axis in square angle against any force tending to change the rotation plane.

According to the mechanics of the rigid solid, apart from its revolution around its symmetry axis, a gyroscope presents in general two main movements: precession and nutation.

To be able to maximize these effects, it is necessary that the gyroscope's mass be as big as possible: the gyroscopes are installed in cases limited in their inside space, generally made of high density materials to obtain a bigger mass.

It is required that the turning radius, is achieved by distributing the mass as far as possible from its revolving axis thereof.

It is necessary that the rotation rate be very big because its dimensions must be reduced. This is obtained by the distribution of the mass as far as possible from its revolving axis.

It is also necessary that the angular acceleration be big which is obtained pressing a high revolving speed to the gyroscope, for example, by means of a motor.

Gyroscopes can have different degrees of freedom.

Gyroscopes with a degree of freedom (rigid) where the rotor is attached to a support in such a way that its movement is limited to its rotation plane.

Gyroscopes with two degrees of freedom (semi-rigid) where the axis is attached to a mobile element or frame called rocker. This rocker in due time is attached to the support by two antagonistic points.

Gyroscopes with three degrees of freedom (universal) where there is a first cradle on which the rotation of the rotation wheel or flywheel unit (first cradle) is mounted. The first cradle or internal cradle is joined to another cradle or external cradle denominated cradle-holder, in such a way that the imaginary line which the joining points of both the internal and the external cradle and the joining points of both the internal and the external cradle are perpendicular in the plane of the cradle.

The cradle holder or external cradle is attached to a support again by means of points which form a perpendicular line to the joining line between the cradle and the cradle holder.

These properties are taken by the present inventors to design a new device to transport loads or individuals or with recreational purposes.

According to a preferred embodiment, a portable gyroscopic device A contains at least one gyroscopic element of the type of a gyroscope with a degree of freedom.

Said gyroscopic element can be actuated using an electric motor which impresses angular speed which can be constant or varied according to the user, by means of electronic controls. For example, remote control means.

According to the present invention, it is desirable that the gyroscope(s) have some adequate weight so that the device of the present invention can be transported by a person easily. Likewise, it is required a high angular speed so that when in position and with revolting speed, they do not vary the direction or alignment of the rotation axis.

The gyroscopic device A of the present invention is capable of making movements in arbitrary directions, sudden changes in direction and is capable of revolting around a perpendicular axis to the longitudinal axis of said device.

The portable gyroscopic device A of the present invention comprises a portable receptacle in which interior there is at least one element of gyroscope. Said portable receptacle A can be configured in the shape of a backpack so that the user can carry it on their back. The backpack can be made of different materials resistant to the use conditions and can be flexible or rigid, for example, high-impact plastic materials such as polyethylene, polypropylene, ABS, polycarbonate, high-impact polystyrene, or nylon among others.

The gyroscopic element comprises at least a flywheel unit located on a revolving axis mounted on a support or cradle holder and includes a source of electric power, for example a set of batteries which feed an electric motor which actuates it, at least one flywheel unit arranged on a revolting axis mounted on a support or cradle holder, includes an electric power source, such as a set of batteries which feed an electric motor actuating it, at least one flywheel and means of control to operate said electric motor. The set of elements detailed are arranged within a portable receptacle A' which in a preferred mode of the invention adopts the form of a backpack.

In another preferred mode of the invention said portable receptacle has rigid walls which work as the support or cradle holder of the gyroscopic element.

In a preferred mode of the invention said portable gyroscopic device of the present invention can be used together with a platform that comprises an area which is capable of supporting the weight of the object or individual to be transported and the ball bearings.

Said ball bearings of the platform comprise rolling elements capable of rotating in any direction (omnidirectional) which adapt themselves to different types of surfaces either flat or with any curve.

The changes in direction which are pressed on the platform can be made by using the body movements of the rider who or which self-balances because of the effect of the portable gyroscopic device of the present invention which is attached to the user's back. To be able to move, the user can propel themselves with one of their feet such as happens with an ordinary skateboard.

According to FIG. 1, the portable gyroscopic device A of the present invention comprises a portable receptacle A' which contains a gyroscopic element with a degree of freedom.

Nevertheless, it is possible to use second degree or third degree gyroscopes called universal gyroscopes to be able to obtain some better balance and change of direction.

According to the present invention, the portable receptacle A' is a frame structure 1 on which is mounted an axle 3 of the gyroscopic element with its flywheel unit 2 that includes at least an electric motor 8 which actuates said mass or flywheel unit 2 of the gyroscope to reach high rotating revolutions and with this the gyroscopic effect desired.

In a preferred mode of the invention, the portable receptacle of the invention A', adopts the form of a backpack which is conformed of a rigid material so that its internal walls serve as a support for the axle 3 of the gyroscopic element and for the electric source and the control devices.

The set of the components of the portable gyroscopic device include the source of energy with a reduced weight, preferably between 1 and 3 kilos.

As described above, the portable receptacle A' of the portable gyroscopic device A' contains a source of energy, for example, a set of 12 volt batteries 6, and an electronic control unit 5 to control the acceleration and braking of the gyroscopic element. Said unit of electronic control 5 is actuated by the user remotely, for example, by means of a manual remote control element B (FIG. 2) which can be wired or wireless.

With relation to the platform 11 (FIGS. 5A, 5B and 5C), it can be constructed with a high-mechanical resistance material which can support the user's weight. The bearing elements of the platform may include at least one ball bearing 10 which enables some omnidirectional movement (omnidirectional bearing). In another preferred mode of the invention, the platform 11 might use other well-known technologies such as drones, air cushion or even a magnetic field to be able to achieve movement.

In a preferred mode of the invention, the platform 11 adopts the form of a skateboard, skate or scooter.

The platform's 11 bearing means 10 are constituted by bearings able to rotate in any direction without restrictions and conformed of materials which are high-impact, wear resistant such as metal or polymeric materials of the ABS, PE, PA, etc. type conventionally used for this type of bearings.

The ball bearing system 10 (omnidirectional) can be replaced by any system, which enable movement in several directions. As it was stated above, it is possible to use a platform propelled by several drones or multi-copters propelled by electric motors. It would also be possible to use an air cushion to get the same effect.

Therefore, in another preferred mode of the invention, the gyroscopic device A of the present invention is used together with a platform 11 which is able to move using mechanical means, drones, air cushions or even electromagnetic fields.

In this way, the user moves riding the platform 11 with omnidirectional bearings propulsing themselves with one foot and is able to make sudden changes of direction and at the same time they can balance themselves using the movement of their own body thanks to the gyroscopic effect of the portable gyroscopic device A of the present invention.

Therefore, with the portable gyroscopic device A of the present invention it is possible to achieve sudden changes of direction, precession combined with nutation and curving paths with instant rotation (e.g. spiral movements).

Additionally, and to empower these effect, the portable gyroscopic device A of the present invention can be used combined with other additional gyroscopic elements located in different parts of the user's body or on the platform itself.

The location of the gyroscopes for the types of movement that are trying to achieve, can be varied, e.g. in the additional gyroscopes they may be located in the user's upper or lower limbs, that is to say, in the arms, including the hands or legs or even on the platform itself or a combination of those.

In a preferred mode of the invention (FIG. 9), the gyroscopes are located in the arms attached to, for example, bracelets 21 in the hands of the user adopting the shape of gloves, or on their legs attached to calf patches or ankle patches or similar.

In a preferred mode of the invention, the portable gyroscopic device A of the present invention can also include propulsion elements which help the user to move, such as, the poles used by skiers or any adaption of those which make them useful for this usage or another element which helps them keep their balance and stability. In a preferred mode of the invention, the additional propulsion elements comprise a pole which has a holding end and at the other end is connected a wheel actuated by an electric motor located concentrically to its axis and commanded by an electronic control located at the holding end of said pole.

Therefore, the present invention provides a set of elements which cooperate operatively to execute a wide variety of movements with recreational purposes, sports or the transportation of objects or individuals and reach the objectives of the present invention.

At present, the use of the portable gyroscopic device A of the present invention cannot be obtained with the devices available in the market.

In FIG. 1 is shown the distribution of the essential components of the portable gyroscopic device A of the present invention.

The portable gyroscopic device A comprises a frame structure 1 to which holding means are attached 7, such as a pair of handles which are adapted to hold the full structure of the gyroscopic device A of the present invention on the user's back. Said frame structure 1 can be constructed with some light material which is shock resistible, such as aluminium or high-impact plastic. On the structure 1 is joined a support or cradle holder 4 on which the axle 3 is mounted, at least one flywheel or mass of the gyroscope. On said axle 3 can be assembled one or more of a mass or flywheel unit 2 of the gyroscope which are actuated by an electric motor 8. In a preferred mode of the invention, the motor is mounted on the axle 3 of the gyroscope.

Figure 2:
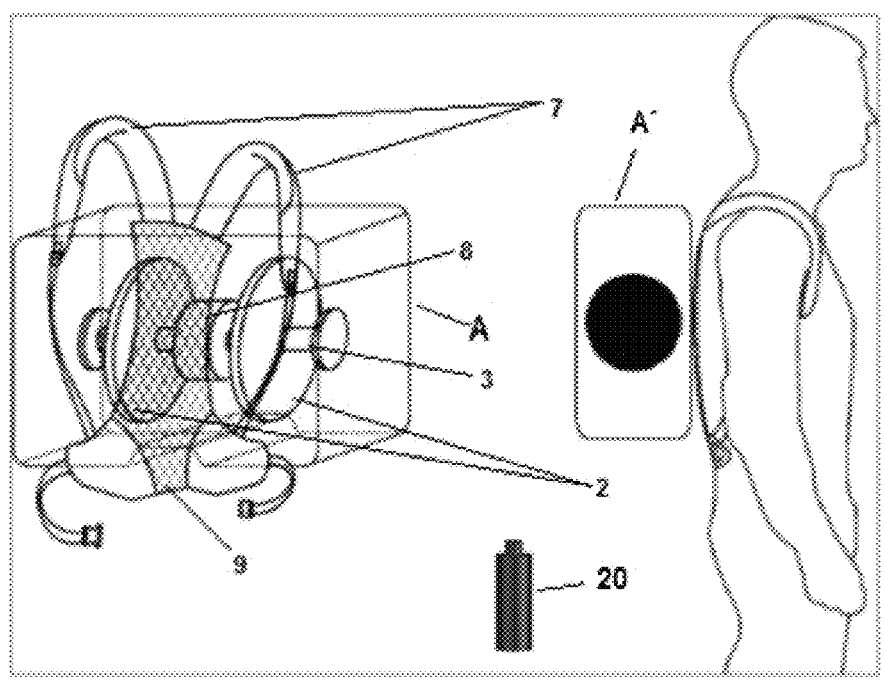
FIG. 2A is a perspective view of the portable gyroscopic device of FIG. 1 arranged in a portable receptacle which adopts the form of a backpack.
FIG. 2B is a side view of the portable gyroscopic device of FIG. 1 arranged in a portable receptacle on a user.
FIG. 2C is a perspective view of a remote control according to an exemplary embodiment of the present disclosure.

On the base of the frame structure 1 are arranged an electric source of power 5, for example, a set of 12 volts batteries and an electronic control system 6. All these elements are arranged within a portable receptacle A' attached to a harness 9. In FIG. 2 is shown a preferred mode of the invention where said portable A' attached to its harness, is used as a backpack (FIG. 2).

The purpose of the portable receptacle A' together with its harness 9 is to protect the elements of the gyroscope and facilitate its transportation by the user. In a preferred mode of the invention, the flywheel on its axis is supported on the rigid walls of the receptacle A' (See FIG. 2).

As it was detailed above, the gyroscopic element can comprise more than a flywheel to reduce its size in order to be inserted in a backpack of a conventional size easy to be carried by the user.

Figure 3:
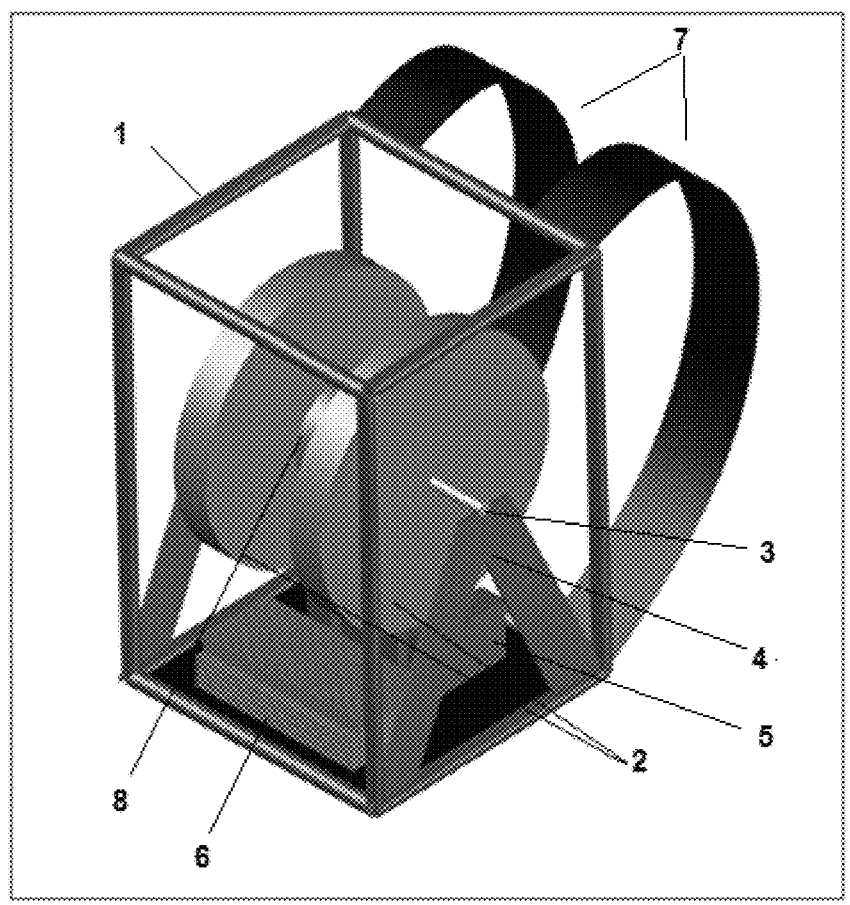
FIG. 3 is a perspective view of a second embodiment of a portable gyroscopic device of the present invention that includes two inertial flywheel units that are arranged on a single axis that is mounted on a support structure to diminish the size of the masses for said wheels.
Figure 4:
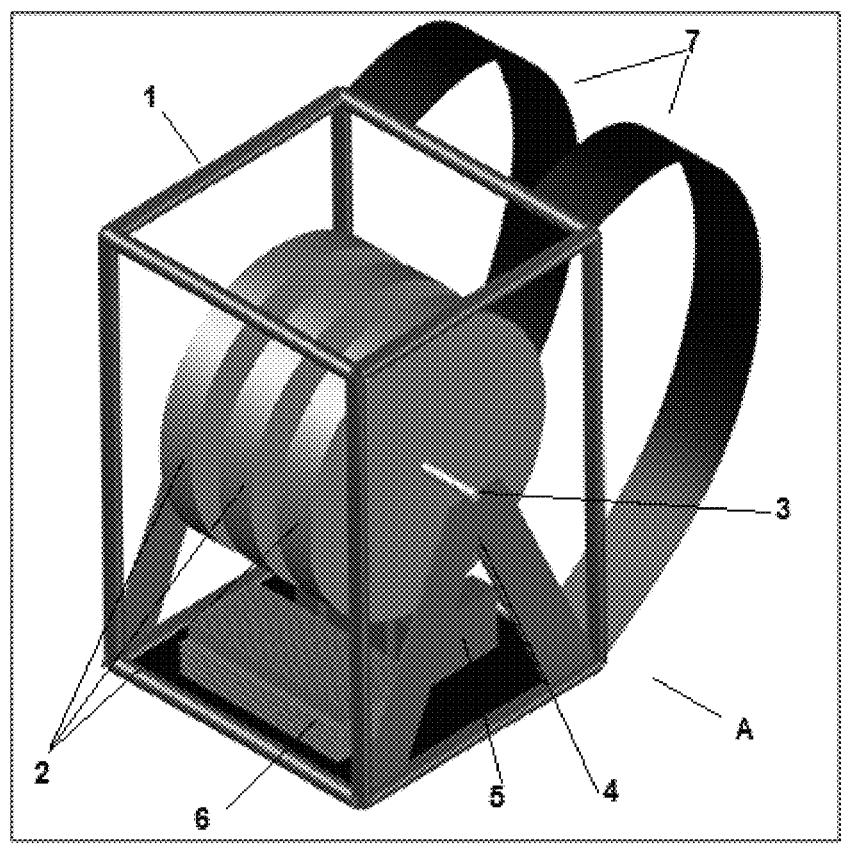
FIG. 4 is a perspective view of a third embodiment of a portable gyroscopic device of the present invention that includes three inertial flywheels arranged on a single axis which is mounted on a support structure for the purposes of to diminish the sizes of the masses for said wheels.

In FIGS. 3 and 4 are formed said preferred modes of the invention where the portable gyroscopic device comprises a gyroscopic element with 2 or 3 flywheel masses.

The electric motor 8 (See FIGS. 2 and 3) which propels one or more flywheel(s) of the gyroscope can be of the several existing models in the market. Preferably, the electric motor which actuates the gyroscope can be of the Brushless type. Said electric motor is arranged preferably spread on the axis of the flywheel, preferably in its central portion concentrically to the flywheel (See FIG. 1) or between two flywheels (See FIG. 2) and can be actuated by means of a remote control B (See FIG. 2), enabling it to change the speed of the flywheel, brake it or if desired, change the position of the flywheel.

Figure 5A:
FIG. 5A is a side view of a platform that includes ball bearings.
Figure 5B:
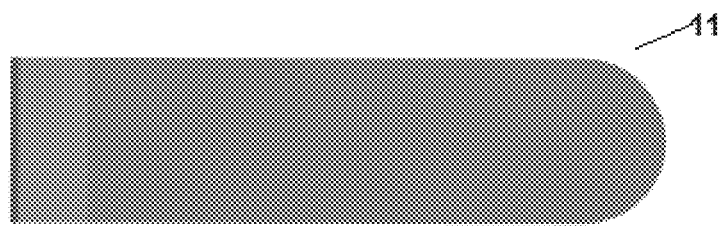
FIG. 5B is a top view of the platform of FIG. 5A.
Figure 5C:
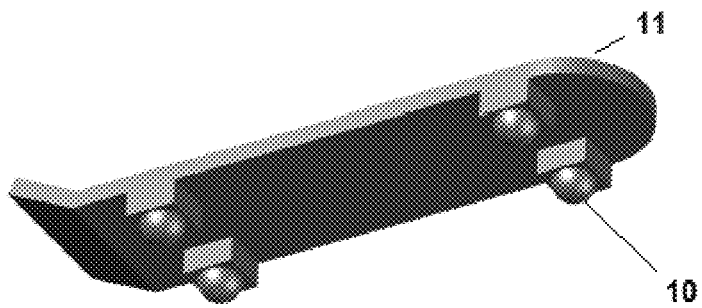
FIG. 5C is a perspective view of the platform and ball bearings of FIG. 5A.

In FIGS. 5A, 5B and 5C is shown a preferred mode of the transportation platform 11 which has ball bearings 10, adopts the form of a skateboard. This platform together with the portable gyroscopic device A these complete the essential elements of the set of devices which operatively cooperate to achieve the goals of the present invention. Optionally, a pair of propulsion poles can be included or if desired, additional portable gyroscopic elements.

As described previously, the platform with ball bearings can adopt the form of a skateboard, scooter or a pair of roller skates for example with ball bearings which cooperate together with the gyroscopic portable device to effect the variety movements described.

In another preferred form of the invention, the transportation platform replaces the ball bearings by other propulsion means such as, drones, air cushions or even magnetic fields, etc.

Figure 6:
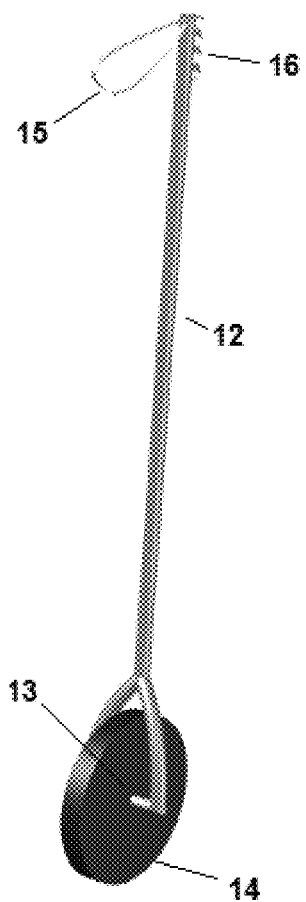
FIG. 6 is a perspective view of a propulsion element which can be used together with the portable gyroscopic device according to an exemplary embodiment of the present invention.

In FIG. 6 is shown an optional propulsion element 12 optional which is used together with the portable gyroscopic device A of the present invention and the platform 11. Said additional propulsion elements adopt the form of poles which are composed of a holding end 15, a stem and in the fastening opposite end a propulsion wheel 14 actuated by an electric motor 13 located for example, in the centre of said wheel. The electric motor can be actuated by electronic elements of remote control 15 located at the holding end of the propulsion element 12 (button, accelerator).

The platform can be of arbitrary forms and shock resistant and flexion resistant materials such as high-impact plastics, laminated wood or metal.

Figure 7:
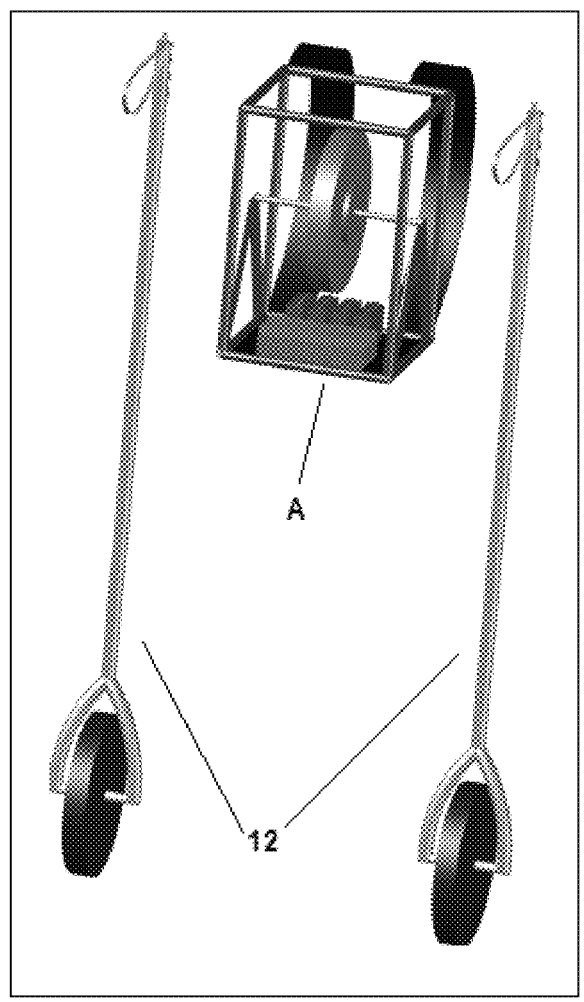
FIG. 7 is a perspective view of the portable gyroscopic device of FIG. 1 (shown without its portable receptacle or backpack) and a pair of propulsion elements according to a an exemplary embodiment of the present invention.

FIG. 7 shows the set of the portable gyroscopic device A and a pair of poles 12.

Figure 8:
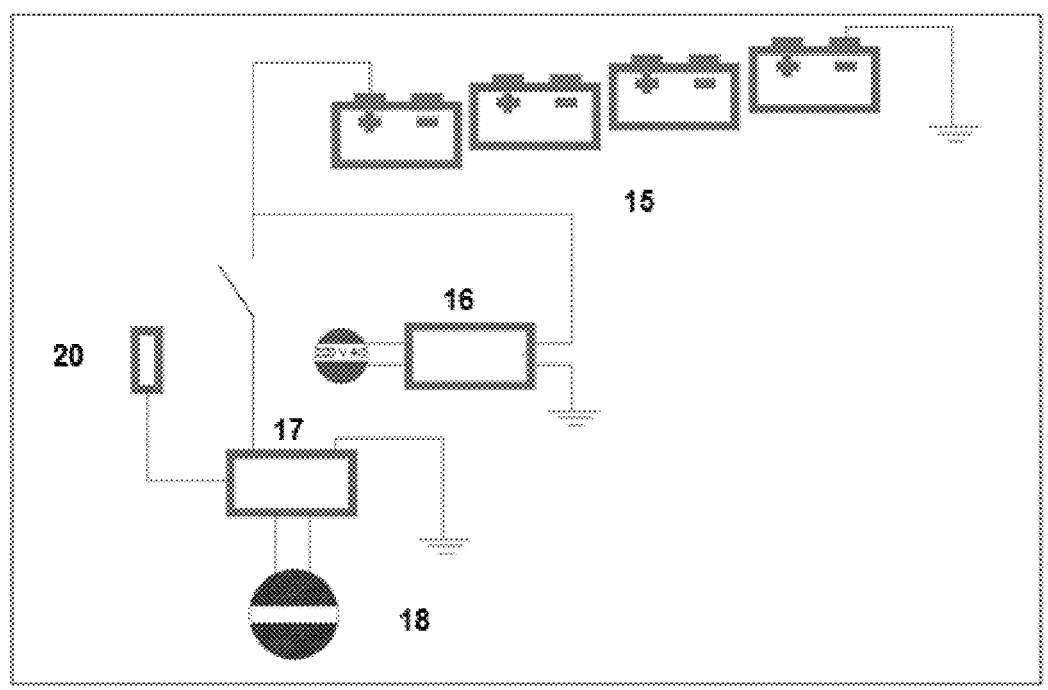
FIG. 8 is a schematic view of components of an electric circuit to feed the electric motor included in the portable gyroscopic device.

FIG. 8 shows a connection scheme for all the components of the electronic circuit to feed the electric motor of the portable gyroscopic device A. The circuit includes a set of batteries 15, e.g. of 12 volts each, rechargeable through a source of alternate current 16 (220 volt). The set of batteries is connected to a control unit 17 which actuates the motor 18 by means of a remote control 20 which can be wired or wireless.

Figure 9:
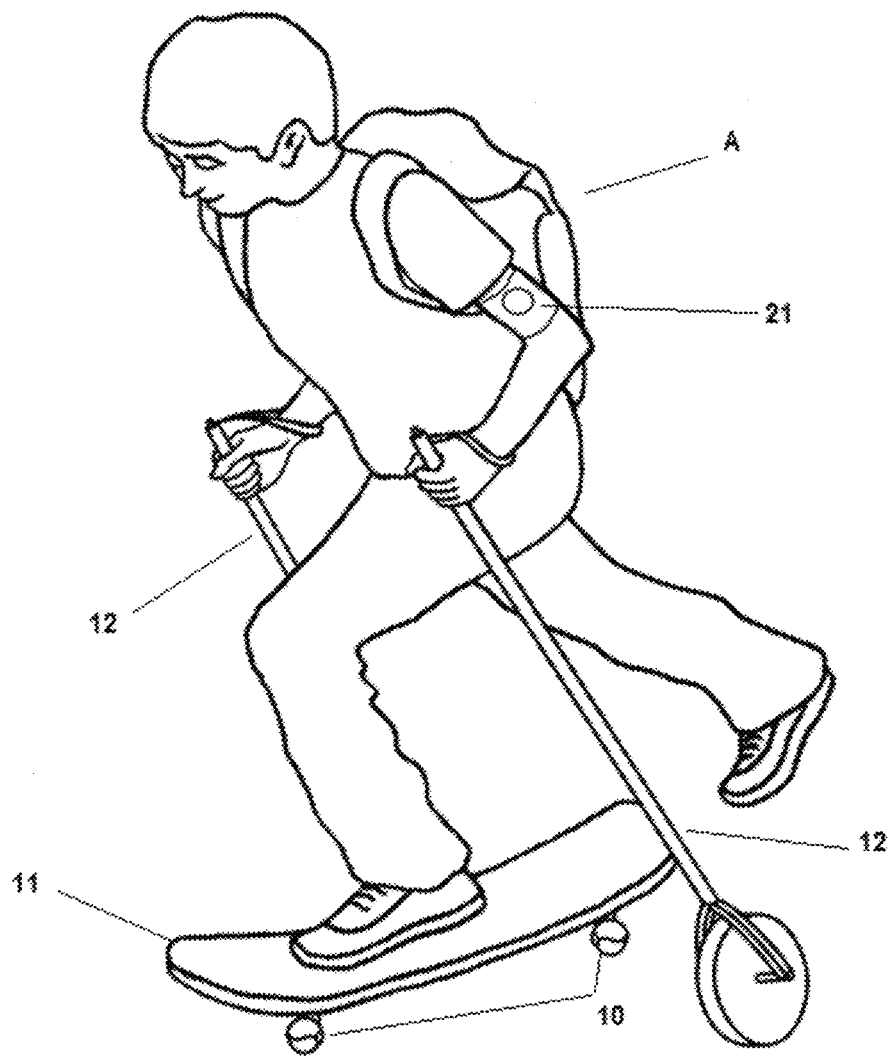
FIG. 9 is a perspective view in a use position of the portable gyroscopic device accessories of the portable gyroscopic device including a pair of drive elements, a gyroscopic bracelet and a platform with ball bearings according to an exemplary embodiment of the present invention.

FIG. 9 shows a referential view in use position for a set of the portable gyroscopic device A of the present invention together with its accessories in a preferred combination of the invention, where the user transports on their back the portable gyroscopic device A and moves thanks to a skateboard 11 with ball bearings 10 and a pair of propulsion poles 12.

The set of accessories which are shown, is characterized by the fact that the additional gyroscopic elements are located in the arms adopting the form of bracelets, in the hands of the user, adopting the form of gloves or in the legs adopting the form of calf pads or ankle pads.

The invention claimed is:

1. A set of portable gyroscopic device and accessories for the transportation of objects or individuals, comprising:
a portable gyroscopic device that is configured to transport at least one of an object and individuals a portable receptacle having a frame structure comprised of a rigid material and having a plurality of elements forming a housing; a first support fixed to and extending from a first side of the housing and a second support, which is independent of the first support, fixed to and extending from a second side of the housing; an axle mounted at one end on the first support and at a second end on the second support; a gyroscopic element that includes one or more masses or flywheels arranged entirely within the frame and mounted on the axle, at least one electric motor configured to actuate at least one of the masses and the flywheels of said gyroscopic element; a source of electric power, and an electronic control configured to manage said electric motor; and
a transportation platform including mechanical bearings that are configured to aid in movement of said platform.

2. The set of accessories according to claim 1, wherein said mechanical bearings are omnidirectional bearings.

3. The set of accessories according to claim 2, wherein said omnidirectional bearings are ball bearings.

4. The set of accessories according to claim 1, wherein the platform is one of a skateboard, a board and a scooter.

5. The set of accessories according to claim 1, further comprising additional gyroscopic that include at least one of bracelets gloves, calf pads and ankle pads.

6. The set of accessories according to claim 1, further comprising additional propulsion elements that are configured to help to propel a user and maintain stability and balance.

7. The set of accessories according to claim 6, wherein said additional propulsion elements are poles, which include at least a bearing element, an electric motor housed in said bearing element and a remote actuator.

* * * * *